(12) United States Patent
Apelsmeier et al.

(10) Patent No.: US 10,924,051 B2
(45) Date of Patent: Feb. 16, 2021

(54) METHOD FOR ADJUSTING A POWER ELECTRONICS UNIT

(71) Applicant: AUDI AG, Ingolstadt (DE)

(72) Inventors: Andreas Apelsmeier, Pollenfeld (DE); Stephan Brüske, Kiel (DE)

(73) Assignee: AUDI AG, Ingolstadt (DE)

( * ) Notice: Subject to any disclaimer, the term of this patent is extended or adjusted under 35 U.S.C. 154(b) by 183 days.

(21) Appl. No.: 16/038,432

(22) Filed: Jul. 18, 2018

(65) Prior Publication Data
US 2019/0173409 A1 Jun. 6, 2019

(30) Foreign Application Priority Data
Dec. 3, 2017 (DE) .................. 10 2017 221 738.3

(51) Int. Cl.
| | |
|---|---|
| *H02P 27/08* | (2006.01) |
| *B60L 15/02* | (2006.01) |
| *B60L 50/51* | (2019.01) |
| *B60L 15/20* | (2006.01) |
| *B60W 50/08* | (2020.01) |
| *B60L 50/50* | (2019.01) |

(52) U.S. Cl.
CPC .............. *H02P 27/08* (2013.01); *B60L 15/02* (2013.01); *B60L 15/20* (2013.01); *B60L 50/50* (2019.02); *B60L 50/51* (2019.02); *B60W 50/082* (2013.01); *B60L 2210/40* (2013.01); *B60L 2250/12* (2013.01); *B60L 2270/142* (2013.01)

(58) Field of Classification Search
CPC .......... H02P 27/08; H02P 27/06; H03K 7/08; H02M 1/12; H02M 1/44; H02M 1/156; H02M 1/157; H02M 1/158; H02M 1/1584; H02M 1/33561; H02M 1/33523; H02M 7/06; H02M 7/5395; H02M 7/53871; B60L 15/20; H02J 5/005
USPC ...... 307/10.1, 10.2, 9.1, 10.5, 64, 66, 82, 80
See application file for complete search history.

(56) References Cited

U.S. PATENT DOCUMENTS

| | | | | |
|---|---|---|---|---|
| 8,086,355 | B1 * | 12/2011 | Stanczak ................ | H02H 3/006 700/286 |
| 8,471,518 | B2 * | 6/2013 | Nishiguchi ............. | B60L 50/61 318/800 |
| 9,880,228 | B2 * | 1/2018 | Wank ...................... | H02S 50/00 |
| 2001/0043652 | A1 * | 11/2001 | Hooley ................... | H04R 1/227 375/238 |

(Continued)

FOREIGN PATENT DOCUMENTS

| | | |
|---|---|---|
| DE | 10 2006 014 898 A1 | 10/2006 |
| DE | 10 2009 049 055 A1 | 4/2011 |

(Continued)

OTHER PUBLICATIONS

Examination Report dated Apr. 26, 2018 of corresponding German application No. 10 2017 221 738.3; 6 pgs.

(Continued)

*Primary Examiner* — Nguyen Tran
*Assistant Examiner* — Jagdeep S Dhillon
(74) *Attorney, Agent, or Firm* — Maier & Maier, PLLC

(57) ABSTRACT

A method for adjusting a modulation of at least one electrical operating parameter of at least one component of a power electronics unit, wherein an electric machine of a vehicle is operated by the power electronics unit, wherein the modulation is adjusted by a user of the vehicle.

7 Claims, 1 Drawing Sheet

(56) References Cited

U.S. PATENT DOCUMENTS

| | | | |
|---|---|---|---|
| 2010/0052583 A1 | 3/2010 | Takamatsu et al. | |
| 2010/0059300 A1* | 3/2010 | Brown | B60L 15/2009 |
| | | | 180/65.285 |
| 2011/0172859 A1 | 7/2011 | Sankaran et al. | |
| 2014/0369169 A1* | 12/2014 | Iida | H04B 11/00 |
| | | | 367/135 |
| 2014/0376269 A1* | 12/2014 | Johnson | A61B 18/1206 |
| | | | 363/17 |
| 2018/0062544 A1* | 3/2018 | Vaneyll | H02P 27/16 |

FOREIGN PATENT DOCUMENTS

| | | |
|---|---|---|
| DE | 10 2011 008 201 A1 | 7/2011 |
| DE | 10 2015 211 253 A1 | 12/2016 |
| EP | 2 848 481 A1 | 3/2015 |
| JP | 2010207030 A | 9/2010 |
| WO | 2015/087700 A1 | 6/2015 |

OTHER PUBLICATIONS

European Search Report dated Apr. 4, 2019, in connection with corresponding EP Application No. 18181077.1 (10 pgs., including machine-generated English translation).

* cited by examiner

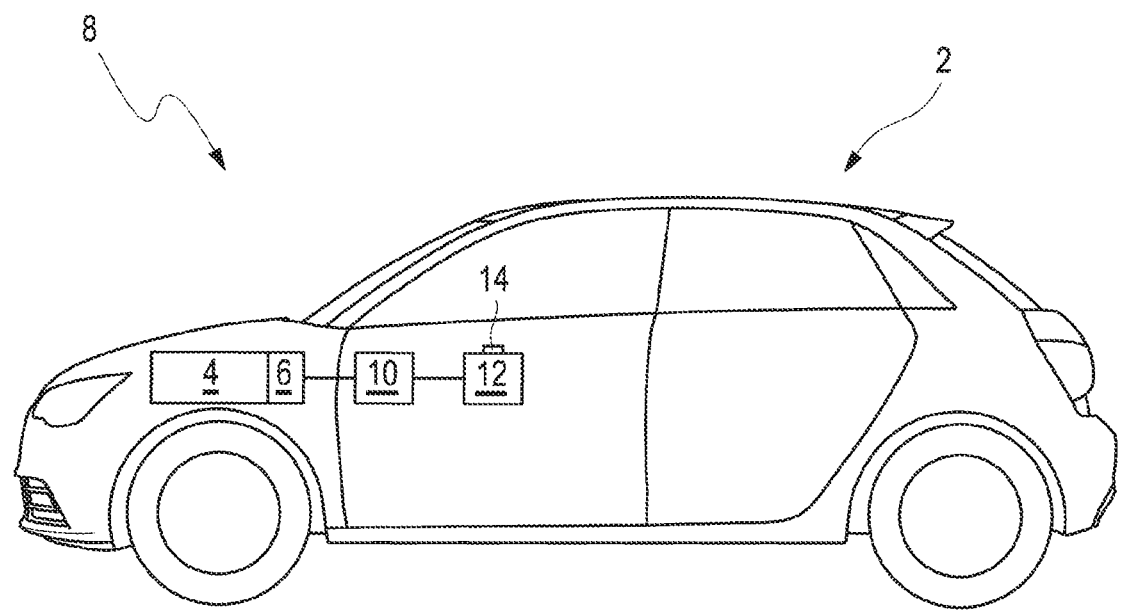

METHOD FOR ADJUSTING A POWER ELECTRONICS UNIT

BACKGROUND

The invention relates to a method for adjusting a power electronics unit of an electric machine and a system for adjusting a power electronics unit of an electric machine.

Different operating modes can be set for a power electronics unit of an electric machine. In a first operating mode, a high power can be achieved thereby, but the noise produced by the power electronics unit is amplified. In contrast, in a second operating mode with reduced noise, only a low power can be achieved. A suitable operating mode needs to be chosen for an operation of the power electronics unit.

A device for controlling a controlled variable with less noise through ON/OFF switching operations is known from the publication DE 10 2006 014 898 A1.

The publication DE 10 2009 049 055 A1 describes a method and a system for the electronic drive of a vehicle.

A drive control device for a track vehicle is known from the publication DE 10 2015 211 253 A1.

Against this background, an object was to adjust, as needed, the power as well as the acoustics of a power electronics unit.

SUMMARY

This object is achieved by a method and a system with the features of the independent patent claims. Embodiments of the method and of the system ensue from the dependent patent claims as well as from the description.

The method according to the invention is provided for adjusting a modulation for at least one electrical operating parameter of at least one component of a power electronics unit, wherein an electric machine of a vehicle is operated by means of the power electronics unit. In this case, the electric machine is provided with the electrical operating parameter by the at least one component and, accordingly, also by the power electronics unit, wherein the modulation is adjusted and/or chosen—for example, manually—by a user of the vehicle itself.

Usually a value of at least one parameter that defines the modulation is adjusted and/or chosen in this regard. The modulation can also be adjusted and thus chosen by selecting a modulation method in this case. Furthermore, the value of a frequency, a maximum power, and/or a maximum degree of modulation can be set as the at least one parameter of the modulation.

As described below, for the at least one component as part of the power electronics unit, at least one electrical operating value that can be modulated by a modulation method, such as, for example, a power, or, in embodiment, the current and/or the voltage, is provided and is characterized by the at least one parameter of the modulation or, as a rule, of the modulation method—for example, by a time course and/or an amplitude,—wherein the at least one parameter is usually set by the user by selection of the value of this at least one parameter. For the at least one operating parameter, for example, a modulation designed as a pulse width modulation is chosen and/or adjusted and is carried out for the at least one component.

This means, for example, that the modulation method for carrying out the modulation is chosen and/or adjusted by the user from a selection of a plurality of modulation methods for carrying out the modulation. Moreover, for a respectively chosen modulation method, the value of the at least one parameter can be chosen and/or can be set.

Alternatively or additionally, the degree of modulation, as a rule the maximum degree of modulation—for example, the maximum degree of modulation of the chosen modulation or of the chosen modulation method—is set by the user for carrying out the modulation.

The vehicle, such as, for example, a motor vehicle, for which the method can be carried out, is driven by the electric machine and is designed and/or is to be referred to as an electric vehicle or hybrid vehicle.

In embodiment, the value of the frequency is set as the at least one parameter by the user as, for example, a switch frequency and/or a clock frequency of the modulation and/or the amplitude of the modulation. In this case, the clock frequency is that frequency with which an actuating signal or a signal for actuation of the at least one operating parameter and/or of the at least one component is generated. The switch frequency is that frequency that is usually actually engaged for the at least one operating parameter and/or the at least one component.

In embodiment, the value of the maximum or maximally possible degree of modulation is set by the user as the at least one parameter of the modulation and/or of the chosen modulation method, depending on the definition of the degree of modulation and/or of the modulation method, to a value greater than 0 and less than 1, to the value 1, or to a value greater than 1.

Moreover, the modulation is set by the user for at least one component that is designed as a semiconductor, such as, for example, a power semiconductor, and/or as an inverter.

In addition, it is provided that, as the at least one electrical operating parameter, dependent on the respectively chosen modulation and/or on the respectively chosen modulation method, a maximum value of the power is set as the at least one parameter, as a rule a maximally possible and/or adjustable power that results for an operation of the power electronics unit and/or of the electric machine and that, depending on the modulation and/or the modulation method, is maximally possible to achieve.

It is optionally provided that, for example, a maximum voltage and/or a maximum current is/are set by the user as the at least one electrical operating parameter, by adjustment of the modulation. The maximum power, the maximum current, and/or the maximum voltage is/are chosen each time depending on the definition of the at least one parameter for the modulation whose value is set, wherein the at least one operating parameter of the at least one component is correspondingly modulated.

As a rule, the power, the voltage, and/or the current, as the at least one operating parameter, vary or varies during an operation of the power electronics unit and/or of the electric machine, for example, depending on a mechanical load of the electric machine, a respective demand placed on the electric machine, and/or an amount of electrical energy that is supplied to the power electronics unit and/or to the electric machine from a battery.

Different from this, however, is the maximum or maximally possible power or operating power or, correspondingly, the maximum or maximally possible voltage or operating voltage, and/or the maximum or maximally possible current or operating current as the at least one operating value that is set by selection of the modulation, the modulation method, and/or, for example, the maximum degree of modulation. This at least one maximum operating parameter or a maximally possible and/or adjustable value of this operating parameter is fixed by selection of the modulation.

Depending on the chosen modulation, the maximally modulation-dependent value can be achieved for the at least one operating parameter.

By setting the maximum power, a range of travel or a distance that can be traveled by the vehicle can also be adjusted by the driver.

Through adjustment of the modulation, furthermore, the acoustics, such as, for example, noise, of the power electronics unit and/or of the electric machine can be influenced by the user.

The system according to the invention is designed for adjusting and/or choosing a modulation of at least one electric and, accordingly, physical operating parameter of at least one component of a power electronics unit. The power electronics unit is designed for the purpose of operating an electric machine of a vehicle. The at least one component of the power electronics unit is designed, for example, for the purpose of supplying the electric machine with the electrical operating parameter. The system has at least one operating unit or one operating element with which the modulation can be adjusted and/or chosen by a user of the vehicle.

The at least one operating unit has at least one button, one switch, and/or rotary knob, such as, for example, a controller, with which the modulation can also be variably or continually adjusted by the user of the vehicle. Accordingly, among other things, it is possible to use the at least one operating unit to choose a modulation method from a selection of a plurality of modulation methods as well as, furthermore, to set a maximum value of the degree of modulation, for example, for a respectively chosen modulation method.

The modulation method is chosen by the user from a plurality of possible modulation methods. These modulation methods involve, for example, among others, a discontinuous modulation—as a rule, a discontinuous pulse width modulation (DPWM)—a space vector modulation, or a sinusoidal triangular modulation. By selection of the space vector modulation, it is possible to operate the power electronics unit and/or the electric machine and accordingly the vehicle in a comfort mode as a possible operating mode. By selection of the discontinuous pulse width modulation, it is possible to operate the power electronics unit and/or the electric machine and accordingly the vehicle in an efficiency mode as a possible operating mode. Furthermore, it is possible to choose a modulation that is to be referred to and/or is designed as a hyper-modulation, with which the power electronics unit and/or the electric machine, and accordingly the vehicle, is to be operated in a power mode as a possible operating mode, wherein usually a degree of modulation greater than 1 is set. In the latter case, losses in comfort ensue, but a good efficiency results. Furthermore, an operating mode designed as an acoustic mode is also possible, in which the power electronics unit and/or the electric machine, and accordingly the vehicle, can be operated especially quietly.

In embodiment, a display field of the operating unit suggests a plurality of operating modes for selection by the user, wherein the user operates the operating unit to choose the operating mode that is suitable to him. Based on such a selection, when the method is implemented, the system is used to choose automatically the modulation method that is selected by the user and accordingly effects the desired operating mode. Additionally, after the selection of the operating mode and, accordingly, of the modulation method, the value of the at least one parameter for the chosen modulation method is displayed and it is suggested to the user how the value of this at least one parameter can be set or is to be set in order to vary and/or to adjust the operating mode more precisely. In this case, for a particularly chosen modulation method, it is possible, for example, to set, as the at least one parameter, the maximum degree of modulation, as a result of which the maximum power can also be set.

The system has a control unit or a control device, which is designed for the purpose of monitoring and, accordingly, of controlling and/or regulating an implementation of at least one embodiment of the presented method. The control unit is designed here, for example, for the purpose of monitoring a function for implementing the at least one embodiment of the presented method and, accordingly, for controlling and/or regulating said embodiment and in this case, activating as well as deactivating the method via the function.

With the method and the system, it is possible, among other things, usually for the driver, as a user of the vehicle, by selection and/or adjustment of the modulation, to increase, as needed, the efficiency and/or the maximum power of the inverter as component of the power electronics unit. It is possible thereby for the user to strike a balance between comfort, which, among other things, is dependent on the acoustics of the power electronics unit, and efficiency, which, among other things, is dependent on the maximum power of the power electronics unit, and, accordingly, by adjustment of the modulation, to actively choose an individual operating mode provided to him. Accordingly, it is possible, among other things, for the user to vary the clock frequency and/or the switch frequency of the modulation itself.

For adjusting comfort, usually relative to the acoustics, it is possible to reduce the frequency, formed as clock frequency and/or switch frequency, for modulation of the at least one electrical operating parameter of the at least one component of the power electronics unit to a maximum value of 10 kHz, for example, as a result of which it is possible, in turn, to prevent a high-frequency buzzing sound, such as occurs, for example, in the case of a street car. Of course, the travel range of the vehicle can by increased, in turn, by setting a lower frequency. By setting the frequency and/or, for example, the maximum degree of modulation for the modulation of the at least one operating parameter, the user strikes a balance between comfort and efficiency.

An adjustment of the modulation is actively undertaken by the user with the operating unit of the system. In this case, it is possible for the operating unit also to be used for other purposes. The operating unit comprises, for example, at least one button, which, in one embodiment, can be rotated and/or shifted and, accordingly, is designed as a knob. Through the display field of the operating unit, furthermore, different menu items can be displayed and can be operated by the user for adjusting and/or choosing the modulation, such as, for example, the modulation method, the maximum degree of modulation, for example, the maximum power, and/or the frequency. In this case, it is possible for the control unit to be designed, for example, as a smartphone or mobile phone. For example, the operating unit is permanently installed in the vehicle or is designed to be used independently from the vehicle. It is possible here, for example, for the operating unit to exchange signals with the vehicle via electromagnetic waves and, accordingly, for example, also with the control unit of the system.

It is likewise possible to connect such a mobile operating unit to the vehicle, and, accordingly, to the control unit of the system, at least intermittently and also in a disconnectable manner via a physical interface. It is likewise possible to purchase or/to book the function or a corresponding feature for carrying out the method as software for a limited period of time on a limited number of days, such as, for example, only over a weekend, as a feature-on-demand. In embodiment, the operating unit has a button designed as a slide control and/or a menu item designed as a slide control with which it is possible to set a value of the frequency, the maximum power, and/or, for example, the maximum degree of the modulation in a variable manner as well as in a continuous manner.

Accordingly, it is possible for the user to adjust or to find an optimum between comfort, which is dependent on the acoustics, and the range of travel and/or the maximum power. It is likewise possible here to actively choose a maximum frequency and/or the maximum degree of modulation as a parameter of the modulation. Thus, it is possible, for example, to set the maximum degree of the modulation to a value of <1, by way of which nearly no acoustic impairments ensue in the interior space of the vehicle. In contrast, in order to increase the maximally possible power, it is possible, for example, to increase the maximum degree of modulation and/or the frequency as a parameter of the modulation. In this case, the user chooses the extent to which he wishes to take into account acoustic drawbacks in order to increase the power. Due to the possibility of adjusting the modulation of the at least one electrical operating parameter of the power electronics unit, the user can, among other things, make an electrification of the vehicle come alive for him.

By operating the operating unit, the user has a direct influence on, among other things, the clock frequency and/or the switch frequency of semiconductors of the power electronics unit. Accordingly, in regard to the acoustics and a consumption of electrical energy in the vehicle and, accordingly, for the range of travel of the vehicle, he has the possibility of making an individual choice. It is likewise possible to vary individually the maximum degree of modulation as the at least one parameter of the modulation or of the modulation method, for example, or the electrical operating parameter and, accordingly, likewise to strike a balance between the acoustics and the maximum power.

The power electronics unit is designed for the purpose of actuating the electric drive of the vehicle—for example, a three-phase electric machine. In this case, the power electronics unit has an inverter with a constant clock frequency of 10 kHz, for example, over an entire operating range, wherein the value of the clock frequency can be adjusted by the user and accordingly can be chosen. In this case, it is also possible to vary the clock frequency of the inverter depending on the rotational speed and, during a startup of the vehicle, for example, to reduce it to 5 kHz for the reduction of losses. Of course, in the case of such a reduction in the clock frequency, a higher current ripple factor and a deterioration of the acoustics ensues, which, for example, is manifested by a high-frequency buzz.

Furthermore, the power electronics unit has at least one power semiconductor as a component for which a switch frequency is provided, the value of which is adjusted and/or chosen using the method, wherein a parity between switching losses and forward power losses is obtained. Furthermore, in the scope of the method, it is also possible to adjust the modulation by selecting a continuous modulation method or a discontinuous modulation method and, accordingly, to implement a continuous or discontinuous modulation for the at least one operating parameter.

The switch frequency and the clock frequency are directly proportional to a switching loss in a continuous modulation method. If the switch frequency is halved, for example, it is possible to reduce by 25% the total loss of power semiconductors of an inverter. For an efficiency of the power electronics unit and of the electric machine of 96% as well as for a power of 100 kW for the electric machine for driving the vehicle, a reduction of the losses from 4 kW to 3 kW is obtained.

Furthermore, it is possible to reduce a switching loss by selecting a discontinuous modulation method, wherein a switch frequency of power semiconductors is reduced by one-third in comparison to a clock frequency. However, even in such a discontinuous modulation method, a current ripple factor increases, as a result of which the acoustics deteriorate. In regard to an electromagnetic compatibility, in the case of power semiconductors and/or an inverter of a power electronics unit, it is possible to adjust or to choose a so-called random pulse width modulation (random PWM) with which, for example, a clock frequency is randomly varied, for example, by a value of +/−1%. In this way, an interference level of the electromagnetic compatibility (EMC) has a broader scatter.

Furthermore, the power electronics unit that has the inverter as a component can be utilized for a traction drive, wherein, for a continuous modulation, a maximum degree of modulation with the value 1 is set. However, it is also possible to use a maximum degree of modulation with a value of >1. In this way, a higher maximum power of the drive, which comprises the electric machine and the power electronics unit, can be achieved with the same utilized hardware. Of course, for a maximum degree of modulation of >1, the acoustics are substantially poorer. The degree of modulation describes, for example, a ratio of the input electrical operating value—for example, a line-to-line voltage—that is provided to the power electronics unit and an output operating value that results on account of the respectively adjusted and/or chosen modulation—for example, a direct current voltage or DC voltage that is supplied to the electric machine by the power electronics unit, with the electric machine being supplied by the power electronics unit with the operating parameter and being operated by means of the power electronics unit.

Further advantages and embodiments of the invention ensue from the description and the appended drawing.

It is understood that the above-mentioned features and the features still to be discussed below can be used not only in the respectively presented combination, but also in other combinations or alone, without leaving the scope of the present invention.

BRIEF DESCRIPTION OF THE DRAWINGS

FIG. 1 comprises a schematic illustration of an embodiment of the system according to the invention for carrying out an embodiment of the method according to the invention.

DETAILED DESCRIPTION

FIG. 1 shows, in schematic illustration, a vehicle 2, which has an electric machine 4 with which the vehicle 2 is to be driven. In this case, the electric machine 4 is associated with a power electronics unit 6 for operating the electric machine 4—for example, for controlling an operation of the electric machine 4. The embodiment of the system 8 according to the invention comprises, as a component, a control unit 10, which, in this case, is likewise arranged in the vehicle 2, as well as at least one operating unit 12, which has at least one button 14 designed as a knob. In this case, the at least one operating unit 12 is connected to the power electronics unit 6 via the control unit 10. Depending on the design of the system 8, the at least one operating unit 12 is usually installed in the interior of the vehicle 2 or else can be utilized or controlled independently of the vehicle 2, wherein the connection between the at least one operating unit 12, the power electronics unit 6, and/or the control unit 10 can be made via an interface or wirelessly with exchange of electromagnetic waves.

At least one electrical operating value, which influences an operation of the electric machine 4 and/or of the power electronics unit 6, is a voltage and/or a current, which is varied in time periodically, for example. Further provided, for at least one operating parameter, is a modulation that, when the embodiment of the method is carried out by a user, such as, for example, a driver, of the vehicle 2, can be set individually by operating the at least one operating element 12. This also comprises selecting a modulation method for carrying out the modulation as well as setting the value of at least one parameter that defines the modulation. The at least one parameter is, for example, a degree of modulation, a maximally possible power, or a frequency, that is, a switch frequency and/or a clock frequency, of a current or of a voltage as examples for the electrical operating parameter of at least one component of the power electronics unit 6, such as, for example, of at least one semiconductor and/or one inverter of the power electronics unit 6. In this case, it is possible for the user to variably adjust and/or choose the value of the parameter for the modulation of the at least one operating parameter by, for example, operating, e.g. by sliding and/or rotating, the button 14 of the operating element 12, as a result of which the maximum power as well as the acoustics of the power electronics unit 6 and/or the electric machine 4 are adjusted. The at least one modulated operating parameter is supplied to the electric machine 4 by the power electronics unit 6 and, accordingly, the electric machine 4 is operated by means of or through the power electronics unit 6.

The invention claimed is:

1. A method for adjusting a modulation of at least one electrical operating parameter of at least one component of a power electronics unit comprising:
    operating an electric machine of a vehicle supplied by the power electronics unit, and
    adjusting the modulation,
    wherein a modulation method is selectable by a user from a plurality of modulation methods for carrying out the modulation,
    wherein a degree of modulation is adjusted by the user for carrying out the modulation,
    wherein the degree of modulation relates to an efficiency and acoustic output of the at least one component of the power electronics unit, so that an increase of the degree of modulation by the user corresponds to an increase of the efficiency and acoustic output of the at least one component of the power electronics unit and a decrease of the degree of modulation by the user corresponds to a decrease of the efficiency and acoustic output of the at least one component of the power electronics unit,
    wherein the plurality of modulation methods from which the user selects comprises at least one of a discontinuous modulation method, a space-vector modulation method, and a sinusoidal triangular modulation method.

2. The method according to claim 1, wherein a frequency of the modulation is also set by the user, the frequency of the modulation corresponding to a clock frequency or a switch frequency of at least one semiconductor component and/or inverter of the power electronics unit.

3. The method according to claim 1, in which a maximum power is set by the user.

4. A system for adjusting a modulation of at least one electrical operating parameter of at least one component of a power electronics unit,
    wherein the power electronics unit is designed for the purpose of supplying an electric machine of a vehicle,
    wherein the system is provided with an operating unit with which the modulation can be adjusted by a user of the vehicle,
    wherein a modulation method is selectable by the user from a plurality of modulation methods for carrying out the modulation,
    wherein a degree of modulation is adjusted by the user for carrying out the modulation,
    wherein the degree of modulation relates to an efficiency and acoustic output of the at least one component of the power electronics unit, so that an increase of the degree of modulation by the user corresponds to an increase of the efficiency and acoustic output of the at least one component of the power electronics unit and a decrease of the degree of modulation by the user corresponds to a decrease of the efficiency and acoustic output of the at least one component of the power electronics unit,
    wherein the plurality of modulation methods from which the user selects comprises at least one of a discontinuous modulation method, a space-vector modulation method, and a sinusoidal triangular modulation method.

5. The system according to claim 4, in which the operating unit has at least one button with which the modulation can be adjusted by the user of the vehicle.

6. The system according to claim 4, further comprising:
    a control unit that is designed for the purpose of controlling modulation.

7. The system according to claim 4, wherein a frequency of the modulation is also set by the user, the frequency of the modulation corresponding to a clock frequency or a switch frequency of at least one semiconductor component and/or inverter of the power electronics unit.

* * * * *